United States Patent [19]

King et al.

[11] Patent Number: 4,917,140

[45] Date of Patent: Apr. 17, 1990

[54] PRESSURE REGULATOR VALVE

[75] Inventors: Michael F. King, Brownsburg; Charles F. Long, Indianapolis; Phillip F. McCauley, Danville, all of Ind.

[73] Assignee: General Motors Corporation, Detroit, Mich.

[21] Appl. No.: 350,188

[22] Filed: May 11, 1989

[51] Int. Cl.[4] ............................................. G05D 16/10
[52] U.S. Cl. .................................... 137/116.3; 251/117
[58] Field of Search ....................... 137/116.3; 251/117

[56] References Cited
U.S. PATENT DOCUMENTS 2,016,234 10/1935 Hughes ........................... 251/117 X
2,965,120 12/1960 Snyder ............................. 137/116.3
3,171,433 3/1965 Borman ....................... 137/116.3 X
4,071,042 1/1978 Lombard ..................... 137/116.3 X Primary Examiner—Robert G. Nilson
Attorney, Agent, or Firm—Donald F. Scherer

[57] ABSTRACT

A pressure regulator valve has a valve spool slidably disposed in a valve bore to control the pressure in a hydraulic passage by exhausting excess fluid delivered to the passage. The valve also has a restricted passage which supplies fluid from a main inlet passage to the controlled fluid passage continuously. The restricted passage reduces the amount of valve spool movement required during normal pressure regulation.

2 Claims, 1 Drawing Sheet

PRESSURE REGULATOR VALVE

BACKGROUND OF THE INVENTION

The present invention relates to hydraulic control valves and more particularly to pressure regulator valves.

Hydraulic systems generally having a positive displacement for supplying pressurized fluid to a plurality of control valves. Pressure regulator valves are used to provide controlled pressure levers throughout the system by exhausting excess fluid delivered by the pump. The regulator valves generally operate by providing a controlled valve connection between the main pressure inlet and a controlled pressure outlet and also between the controlled pressure outlet and an exhaust passage.

When a spool type valve is used, the valve overlap; i.e., opening and closing of the passages, can result in pulsations of the pressure level at the controlled outlet passage. As the system pressure and flow requirements increase, the sensitivity of the overlap also increases. With the increased flow requirements, system leakage also becomes a factor as the amount of overlap increases.

To provide accurate flow and pressure coverage throughout the desired range results in considerable expense in manufacturing the regulator valves to the desired accuracy.

SUMMARY OF THE INVENTION

The present invention reduces the overlap sensitivity and leakage. The valve structure disclosed herein has an orifice or restricted passage which provides direct and continuous fluid communication between the pressure inlet passage and the controlled pressure outlet passage. The valve structure also has a full flow passage connection through which fluid flow is controlled by the valve spool.

The full flow passage connection is closed prior to the exhaust passage being opened. The valve overlap therefore only controls flow supplied through the orifice passage. Since the potential flow volume through the orifice passage is greatly reduced, as compared to the full flow passage, the overlap sensitivity is reduced.

The maximum valve leakage is essentially reduced to the maximum flow volume permitted by the orifice passage when the controlled pressure in the outlet passage is satisfied and the flow requirement of the system is zero. There are very few operating conditions under which zero flow requirements will be present, and therefore, the leakage will, in most instances, be considerably less than the maximum flow permitted by the orifice passage.

It is an object of this invention to provide an improved pressure regulator valve having a valve spool for controlling fluid flow and pressure from an inlet passage to an outlet passage, and also wherein, an orifice controlled passage provides a continuous flow connection between the inlet passage and the outlet passage.

It is another object of this invention to provide an improved pressure regulator valve for controlling fluid pressure in an outlet passage wherein a multi-plate valve spool is slidably disposed in a valve bore which is connected with an inlet passage, the outlet passage, an exhaust passage and a restricted passage, and further wherein the valve spool permits continuous fluid flow through the restricted passage from the inlet passage to the outlet passage, and also wherein the valve spool has control edges on the valve lands thereof for selectively controlling direct fluid flow from the inlet passage to the outlet passage and from the outlet passage to the exhaust passage.

These and other objects and advantages of the present invention will be more readily apparent from the following description and drawings.

DESCRIPTION OF THE EXEMPLARY EMBODIMENTS

Figure 1:
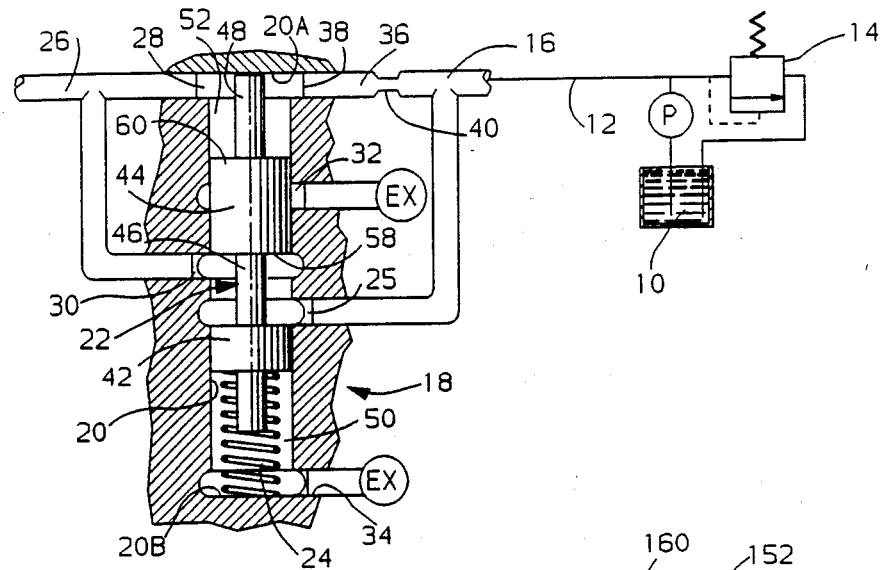
FIG. 1 is a diagrammatic representation of a hydraulic system incorporating one embodiment of a regulator valve in accordance with the invention.

Referring to the drawings, wherein like characters represent the same or corresponding parts throughout the several views, there is seen in FIG. 1 a hydraulic circuit having a pump P which draws fluid from a reservoir 10 and delivers the fluid to a system pressure passage 12. The pressure level in the system pressure passage 12, which is distributed to a multitude of valve and hydraulic devices, not shown, is controlled by a conventional pressure regulator valve 14 which operates in a well known manner.

The passage 12 is in fluid communication with a main inlet passage 16, which in turn is connected with a pressure regulator valve 18. The pressure regulator valve 18 includes a valve bore 20, a valve spool 22 and a control spring 24. The valve bore 20 is a single diameter bore which is closed at both ends. The valve bore 20 is in fluid communication with the main inlet passage 16 at a port 25, with a pressure controlled outlet passage 26 at ports 28 and 30, with a pair of exhaust ports 32 and 34 and with a restricted inlet passage 36 at a port 38. The restricted inlet passage 36 is in fluid communication with the main inlet passage 16 through a restriction or orifice 40.

The valve spool 22 has a pair of spaced valve lands 42 and 44 which are slidably disposed in valve fit within the bore 20. A reduced portion 46 is connected between the valve lands 42 and 44 and a spring set position member 48 is secured to the valve land 44 and is urged into abutment with one end 20A of bore 20 by the spring 24. The spring 24 is compressed between the valve land 42 and the other end 20B of valve bore 20.

The valve land 42 and valve bore 20 cooperate to form a chamber 50 in which the spring 24 is disposed. The chamber 50 is continuously connected to exhaust through port 34 to prevent pressure buildup within the chamber 50. The valve land 44 and the valve bore 20 cooperate to form the pressure control chamber 52 which is in fluid communication with ports 28 and 38 which are connected to passages 26 and 36, respectively. In the spring set position shown, the valve spool 22 permits unrestricted fluid flow between the main passage 16 and the controlled pressure passage 26. This flow occurs from port 25 to port 30 between the valve lands 42 and 44. At the same time, continuous fluid flow between the restricted fluid passage 36 and the pressure controlled passage 26 is present.

Fluid pressure in the pressure controlled passage 26 operates on the upper surface of valve land 44 in the pressure control chamber 52. At a predetermined pressure level, the force created on valve spool 22 at valve land 44 will be sufficient to overcome the force in spring 24 urging the valve spool 22 downward against the spring 24 such that the valve land 44 will begin closing the port 30 from the port 25.

Figure 3:
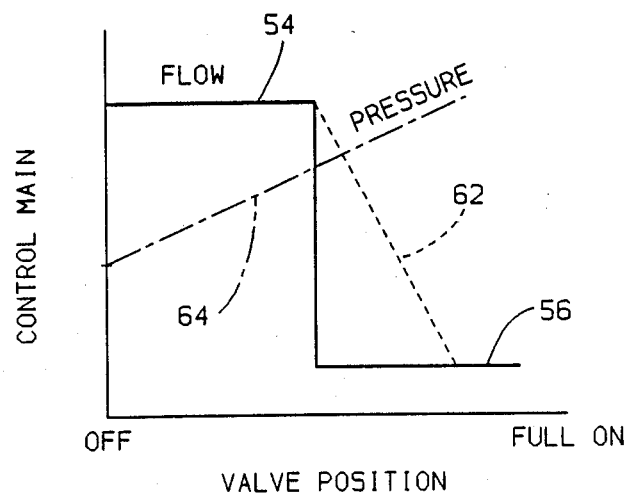
FIG. 3 is a curve describing fluid flow and pressure at the regulator valves shown in FIGS. 1 and 2.

As seen in FIG. 3, the unrestricted flow between passage 16 and 26 is indicated by the line 54. At a predetermined pressure level, the valve spool 22 will be moved sufficiently to close the port 30 completely, such that the fluid flow through valve 18 will be reduced, as shown by the line 56.

The valve land 44 has a pair of control edges 58 and 60 which are operable to control fluid communication between the valve bore 20 and the ports 30 and 32, respectively. When the control edge 58 closes the port 30, an abrupt change in fluid flow through the valve 18 occurs, as represented by the curve of FIG. 3. The control edge 60 does not open the port 32 until after the port 30 has been closed. In the prior art valves, it is required to provide some degree of overlap between the valve closing of the pressure inlet and opening of exhaust. These systems result in a flow curve represented by dashed line 62 in FIG. 3.

This overlap flow control does not occur with the pressure regulator valve 18, since the valve control edge 60 of land 44 does not open exhaust port 32 until the port 30 has been fully closed. Port 32 will be opened only when the flow directed from restricted passage 36 to the controlled pressure passage 26 is greater than the flow required by a pressure system downstream thereof. The control edge 60 will be effective to open and close the exhaust port 32 as required to maintain the downstream pressure in passage 26 at a level required by the fluid devices which are connected thereto. The flow through port 30 can be directed to lube or sump.

Should a need for a large volume of fluid occur, the pressure in passage 26 would be significantly reduced and the valve spool 22 would move to the spring set position shown, thereby providing substantially unrestricted flow between the passage 16 and the passage 26.

Figure 2:
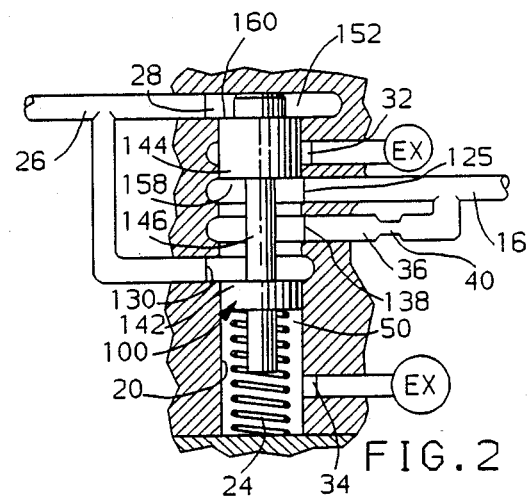
FIG. 2 is a diagrammatic representation of another embodiment of the present invention.

In FIG. 2, there is seen a valve structure similar to the valve structure described above for FIG. 1, wherein a valve bore 20 is in fluid communication with the main inlet passage 16, the restricted pressure passage 36, the controlled pressure passage 26 and a pair of exhaust passages. The valve bore 20 has slidably disposed therein, a valve spool 100 which has formed thereon a pair of spaced valve lands 142 and 144 separated by a reduced area or valley 146.

The valve land 142 and valve bore 20 cooperate to provide the chamber 50, which is in fluid communication through exhaust port 34, with an exhaust passage. The bore 20 and valve land 144 cooperate to provide a control pressure chamber 152 which is in fluid communication through a port 28 with the passage 26. The passage 26 is also in fluid communication through a port 130 with the bore 20. The valve bore 20 is in communication through an exhaust port 32 with an exhaust or lube passage, through a port 125 with the main passage 16 and through a port 138 with a restricted passage 36. The valve land 144 has a pair of control edges 158 and 160 which are operable to control fluid flow between the valve bore 20 and ports 125 and 32, respectively.

The valve structure shown in FIG. 2, will operate to provide a flow curve identical to that shown in FIG. 3 for the valve 18. However, it should be appreciated that the control edge 158 will now be operable to close the inlet passage 16 at port 125. This is different from the valve 18, wherein the control edge 58 is operable to close port 30 and therefore passage 26 from the valve bore 20. The resulting fluid flow through the valve is unchanged and both embodiments operate in substantially the same manner. In FIG. 2, The control edge 160 will not permit communication between passage 26 and port 32 prior to the closing of port 125 by the control edge 158.

Those skilled in the art will recognize that the pressure in passage 26 is determined by the area of valve lands 44 and 144 which are acted upon by fluid pressure in chambers 52 and 152, respectively, and by the force stored in the spring 24. It should also be appreciated that by increasing the force in spring 24, the pressure in passage 26 will be increased to a higher level prior to the closing of ports 30 and 125, and likewise by decreasing the end area of valve lands 44 and 144, the pressure in passage 26 will increase to a higher level prior to valve operation.

The rate designed into the spring 24 will affect the time or flow volume at which the control edges 58 and 158 will close the fluid communication between passages 16 and 26. The pressure rise within the passage 26 that occurs between the initial movement of valve spool 22, 100 and the opening of the exhaust port 32 is represented by line 64 in FIG. 3. The slope of line 64 is determined by the rate within the spring 24.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A pressure regulator valve comprising a valve bore; a valve spool slidably disposed in said valve bore and including a pair of spaced valve lands, a pair of spaced control edges on one valve land and a reduced area between said valve lands; a main flow inlet passage communicating with said valve bore adjacent one control edge of said one valve land; a main outlet passage in fluid communication with said valve bore adjacent the other control edge of the one valve land; restricted flow passage means disposed for continuous flow communication between said main flow inlet passage and said main flow outlet passage; return passage means adjacent said one valve land and being normally closed thereby; spring means for urging said valve spool in one direction to permit fluid flow from said main flow inlet passage to said main flow outlet passage; and pressure control means acting one said valve spool for urging said valve spool to move against said spring in a direction to permit closing said main flow inlet passage by said one control edge of the one valve and and to also permit fluid flow from said outlet flow passage to said return passage when fluid pressure in said outlet flow passage is above a predetermined level.

2. A pressure regulator valve comprising a valve bore; a valve spool slidably disposed in said valve bore and including a pair of spaced valve lands, a pair of control edges on one valve land and a reduced area between said valve lands, a main flow inlet passage communicating with said valve bore adjacent one control edge of said one valve land; a main outlet passage in fluid communication with said valve bore adjacent the other control edge of the one valve land; restricted flow passage means disposed for continuous flow communication between said main flow inlet passage and said main flow outlet passage; return passage means adjacent said one valve land and being normally closed thereby; spring means for urging said valve spool in one direction to permit fluid flow from said main flow inlet passage to said main flow outlet passage; and pressure control means acting one said valve spool for during said valve spool to move against said spring in a direction to permit closing said main flow inlet passage by said one control edge of the one valve and and to also permit controlled opening of said return passage by said other control edge of the one valve land for controlling fluid flow from said outlet flow passage to said return passage when fluid pressure in said outlet follow passage is above a predetermined level, said one control edge fully closing said main inlet passage prior to said other control edge opening said return passage.

* * * * *